US011575970B2

(12) United States Patent
Hong et al.

(10) Patent No.: US 11,575,970 B2
(45) Date of Patent: Feb. 7, 2023

(54) METHOD AND DEVICE FOR CONTROLLING VIDEO PLAYBACK

(71) Applicant: SAMSUNG ELECTRONICS CO., LTD., Suwon-si (KR)

(72) Inventors: Yanting Hong, Nanjing (CN); Yanqing Lu, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/425,871

(22) PCT Filed: Dec. 15, 2020

(86) PCT No.: PCT/KR2020/018357
§ 371 (c)(1),
(2) Date: Jul. 26, 2021

(87) PCT Pub. No.: WO2021/125747
PCT Pub. Date: Jun. 24, 2021

(65) Prior Publication Data
US 2022/0167055 A1 May 26, 2022

(30) Foreign Application Priority Data
Dec. 19, 2019 (CN) .......................... 201911314548.2

(51) Int. Cl.
H04N 21/472 (2011.01)
G06V 20/40 (2022.01)
(Continued)

(52) U.S. Cl.
CPC ..... H04N 21/47217 (2013.01); G06V 10/761 (2022.01); G06V 20/41 (2022.01);
(Continued)

(58) Field of Classification Search
CPC ....... H04N 21/47217; H04N 21/44222; G06V 20/49; G06V 20/46; G06V 10/761; G06V 20/41; G11B 27/34
See application file for complete search history.

(56) References Cited

U.S. PATENT DOCUMENTS

2010/0174700 A1* 7/2010 Krietzman ............ G06F 16/958
725/86
2014/0086557 A1* 3/2014 Yu .......................... G11B 27/28
386/241
(Continued)

FOREIGN PATENT DOCUMENTS

CN 105812941 A 7/2016
CN 106559712 A 4/2017
(Continued)

OTHER PUBLICATIONS

Communication dated Jun. 29, 2021 by the State Intellectual Property Office of P.R. China in counterpart Chinese Patent Application No. 201911314548.2.
(Continued)

Primary Examiner — Sunghyoun Park
(74) Attorney, Agent, or Firm — Sughrue Mion, PLLC

(57) ABSTRACT

The invention provides a method and a device for controlling video playback. The method includes: extracting playback time of a video clip taken for a predetermined scene from a video to be played; displaying a predetermined control corresponding to the playback time of the video clip taken for the predetermined scene on a video player playing the video; and controlling the video player to adjust a playback progress of the video to the playback time of the video clip taken for the predetermined scene to be played, when a trigger operation for the predetermined control is detected.

15 Claims, 6 Drawing Sheets

(51) Int. Cl.
*G06V 10/74* (2022.01)
*G11B 27/34* (2006.01)
*H04N 21/442* (2011.01)

(52) U.S. Cl.
CPC .............. *G06V 20/46* (2022.01); *G06V 20/49* (2022.01); *G11B 27/34* (2013.01); *H04N 21/44222* (2013.01)

(56) References Cited

U.S. PATENT DOCUMENTS

| | | | |
|---|---|---|---|
| 2014/0093164 A1 | 4/2014 | Noorkami et al. | |
| 2014/0245145 A1* | 8/2014 | Kim | G06V 20/46 715/716 |
| 2015/0185965 A1 | 7/2015 | Belliveau et al. | |
| 2015/0350746 A1* | 12/2015 | Tomita | H04N 21/4436 725/34 |
| 2016/0094875 A1 | 3/2016 | Peterson et al. | |
| 2019/0228231 A1* | 7/2019 | Tandon | G06V 20/41 |
| 2019/0349641 A1* | 11/2019 | Choi | G10L 15/02 |
| 2020/0314482 A1 | 10/2020 | Li et al. | |

FOREIGN PATENT DOCUMENTS

| | | |
|---|---|---|
| CN | 109905782 A | 6/2019 |
| KR | 10-2016-0041038 A | 4/2016 |
| KR | 10-2019-0088452 A | 7/2019 |

OTHER PUBLICATIONS

International Search Report (PCT/ISA/210) dated Mar. 15, 2021 by the International Searching Authority in counterpart International Patent Application No. PCT/KR2020/018357.

Written Opinion (PCT/ISA/237) dated Mar. 15, 2021 by the International Searching Authority in counterpart International Patent Application No. PCT/KR2020/018357.

* cited by examiner

METHOD AND DEVICE FOR CONTROLLING VIDEO PLAYBACK

TECHNICAL FIELD

The present application relates to technical field of video processing and playback, and more particularly, to a method and device for controlling video playing.

BACKGROUND ART

At present, various video websites such as iQiyi and Tencent Video provide etc. massive video resources, and the provided resources such as various types of variety shows, TV series, movies and the like are also becoming more abundant, which allows viewers to browse more videos through these websites. Although players on these video websites also provide other playback operations such as skip playback, fast playback, watching clip versions and the like while playing videos, these playback operations cannot assist a user to accurately jump to or directly locate a video scene clip that the user is interested in, since there are following problems in the above playback operations:

1. The skip playback operation can assist the user to manually jump to any frame in the video to be played. However, controllability of this playback operation is relatively poor, which often causes the user to miss the video scene clip of interest.

2. The fast playback operation can provide users with different playback speeds such as slow playback with a playback speed of "0.8", fast playback with a playback speed of "1.5" or "2.0" and so on to change the speed of video playback. However, this playback operation will change the playback speed of the video sound, thereby affecting effect of viewing video.

3. The watching clip versions operation can drastically reduce a total length of the video playback (for example, from 2 hours to 5 minutes) and condense some important line scenes, to assist the user to quickly watch the video. However, this playback operation may cause video scenes to be quickly switched, and it does not meet the user aesthetics.

Therefore, there is an urgent need for a method and device that can assist the user to accurately jump to or directly locate the video scene clip that the user is interested in.

DISCLOSURE OF INVENTION

Technical Problem

According to an aspect of the present invention, a method and device that can assist the user to accurately jump to or directly locate the video scene clip that the user is interested in.

Solution to Problem

An object of the present invention is to provide a method and device for controlling video playback.

According to an aspect of the present invention, a method for controlling video playback is provided, and the method includes extracting playback time of a video clip taken for a predetermined scene from a video to be played, displaying a predetermined control corresponding to the playback time of the video clip taken for the predetermined scene on a video player playing the video, and controlling the video player to adjust a playback progress of the video to the playback time of the video clip taken for the predetermined scene to be played, when a trigger operation for the predetermined control is detected.

Preferably, the predetermined control is a predetermined playback point on a playback progress bar of the video player.

Preferably, the trigger operation for the predetermined control includes a trigger operation for dragging a drag block on the playback progress bar of the video player to the predetermined playback point.

Preferably, the method further includes displaying prompt information for indicating the predetermined control on the video player.

Preferably, the prompt information includes at least one of playback time related to the predetermined scene, descriptive information related to the predetermined scene, and a scene thumbnail related to the predetermined scene.

Preferably, the method further includes: dividing the video into a plurality of shots that are video clips continuously taken by a camera, based on a scene similarity between adjacent frame images in the video, and identifying the video clip taken for the predetermined scene from the plurality of shots.

Preferably, the method further includes: determining whether there are at least two consecutively adjacent shots falling within a predetermined short period of time in the plurality of shots, determining whether a similarity between the at least two consecutively adjacent shots reaches a predetermined threshold, if there are the at least two consecutively adjacent shots falling within the predetermined short period of time in the plurality of shots, and merging the at least two consecutively adjacent shots into one shot, if the similarity between the at least two consecutively adjacent shots reaches the predetermined threshold.

Preferably, the similarity between the at least two consecutively adjacent shots is determined by a similarity between any two non-adjacent shots in the at least two consecutively adjacent shots.

Preferably, determining whether the similarity between the at least two consecutively adjacent shots reaches the predetermined threshold includes: extracting key frame images in the at least two consecutively adjacent shots, and determining that the similarity between the at least two consecutively adjacent shots reaches the predetermined threshold, if a similarity between the key frame images in the at least two consecutively adjacent shots reaches the predetermined threshold.

Preferably, a number of the key frame images extracted for each shot is based on a degree of change in the frame images in each shot.

Preferably, the number of the key frame images extracted for the shot in which the frame images change drastically is greater than the number of the key frame images extracted for the shot in which the frame images change gently.

Preferably, the method further includes determining the degree of change in the frame images in each of the at least two consecutively adjacent shots.

Preferably, determining the degree of change in the frame images in each of the at least two consecutively adjacent shots includes: calculating an average distance of the frame images in each shot, determining that the frame images in the shot change drastically, if there is a frame image having a distance greater than the average distance in the shot, and determining that the frame images in the shot changes gently, if there is no frame image having the distance greater than the average distance in the shot.

Preferably, identifying the video clip taken for the predetermined scene from the plurality of shots includes identifying the video clip taken for the predetermined scene from the plurality of shots according to a predefined condition.

Preferably, the predefined condition is related to a user scene preference.

Preferably, the method further includes: collecting user behavior data for operating the video player, and analyzing the collected user behavior data to determine the user scene preference.

Preferably, the user behavior data includes at least one of a repeat playback operation for any scene in any video by a user, a skip playback operation for any scene in any video by a user, a favorite operation for any scene in any video by a user, a thumb-up operation for any scene in any video by a user, and a comment operation for any scene in any video by a user.

Preferably, the predefined condition is related to a current hot topic.

Preferably, the method further includes using a web crawler technology to perform hotspot mining to obtain the current hot topic.

According to other aspect of the present invention, a device for controlling video playback is provided, and the device includes: an extraction unit to extract playback time of a video clip taken for a predetermined scene from a video to be played, a display unit to display a predetermined control corresponding to the playback time of the video clip taken for the predetermined scene on a video player playing the video, and a playback unit to control the video player to adjust a playback progress of the video to the playback time of the video clip taken for the predetermined scene to be played, when a trigger operation for the predetermined control is detected.

Preferably, the predetermined control is a predetermined playback point on a playback progress bar of the video player.

Preferably, the trigger operation for the predetermined control includes a trigger operation for dragging a drag block on the playback progress bar of the video player to the predetermined playback point.

Preferably, the device further includes a prompt unit to display a prompt information for indicating the predetermined control on the video player.

Preferably, the prompt information includes at least one of playback time related to the predetermined scene, descriptive information related to the predetermined scene, and a scene thumbnail related to the predetermined scene.

Preferably, the device further includes a scene division unit to divide the video into a plurality of shots that are video clips continuously taken by a camera, based on a scene similarity between adjacent frame images in the video, and a scene recognition unit to identify the video clip taken for the predetermined scene from the plurality of shots.

Preferably, the device further includes a first determination unit to determine whether there are at least two consecutively adjacent shots falling within a predetermined short period of time in the plurality of shots, a second determination unit to determine whether a similarity between the at least two consecutively adjacent shots reaches a predetermined threshold, if there are the at least two consecutively adjacent shots falling within the predetermined short period of time in the plurality of shots, and a shot mergence to merging the at least two consecutively adjacent shots into one shot, if the similarity between the at least two consecutively adjacent shots reaches the predetermined threshold.

Preferably, the similarity between the at least two consecutively adjacent shots is determined by a similarity between any two non-adjacent shots in the at least two consecutively adjacent shots.

Preferably, the second determination unit includes a key frame extraction unit to extract key frame images in the at least two consecutively adjacent shots, and a similarity determination unit to determine that the similarity between the at least two consecutively adjacent shots reaches the predetermined threshold, if a similarity between the key frame images in the at least two consecutively adjacent shots reaches the predetermined threshold.

Preferably, a number of the key frame images extracted for each shot is based on a degree of change in the frame images in each shot.

Preferably, the number of the key frame images extracted for the shot in which the frame images change drastically is greater than the number of the key frame images extracted for the shot in which frame images change gently.

Preferably, the device further includes a third determination unit to determine the degree of change in the frame images in each of the at least two consecutively adjacent shots.

Preferably, the third determination unit includes an average distance calculation unit to calculate an average distance of the frame images in each shot, a first change determination unit to determine that the frame images in the shot changes drastically, if there is a frame image having a distance greater than the average distance in the shot, and a second change determination unit to determine that the frame images in the shot changes gently, if there is no frame image having the distance greater than the average distance in the shot.

Preferably, the scene recognition unit identifies the video clip taken for the predetermined scene from the plurality of shots according to a predefined condition.

Preferably, the predefined condition is related to a user scene preference.

Preferably, the device further includes a collection unit to collect user behavior data for operating the video player, and a analysis unit to analyze the collected user behavior data to determine the user scene preference.

Preferably, the user behavior data includes at least one of a repeat playback operation for any scene in any video by a user, a skip playback operation for any scene in any video by a user, a favorite operation for any scene in any video by a user, a thumb-up operation for any scene in any video by a user, and a comment operation for any scene in any video by a user.

Preferably, the predefined condition is related to a current hot topic.

Preferably, the device further includes a hotspot unit to use a web crawler technology to perform hotspot mining to obtain the current hot topic.

According to another aspect of the present invention, a computer-readable storage medium storing a computer program that, when executed by a processor, implements the above method for controlling video playback, is provided.

According to another aspect of the present invention, a computer apparatus is provided, and the computer device includes: a processor; and a memory to store a computer program that, when executed by the processor, implements the above method for controlling video playback.

The method and device for controlling video playback provided by the present invention can not only assist a user to accurately jump to or directly locate a video scene clip that the user is interested in, but also can push the video scene clip that the user is interested in to the user according to predefined conditions such as user preferences and current hot topics, thereby saving user viewing time for the video and filtering out a video scene clip that the user is not interested in, so as to make viewing experience easier and more enjoyable.

Advantageous Effects of Invention

The method and device for controlling video playback provided by the present invention can not only assist a user to accurately jump to or directly locate a video scene clip that the user is interested in, but also can push the video scene clip that the user is interested in to the user according to predefined conditions such as user preferences and current hot topics, thereby saving user viewing time for the video and filtering out a video scene clip that the user is not interested in, so as to make viewing experience easier and more enjoyable.

BRIEF DESCRIPTION OF DRAWINGS

Objects and features of the present invention will become more apparent from the following description taken in conjunction with the accompanying drawings, in which.

MODE FOR THE INVENTION

Hereinafter, embodiments of the present invention will be described in detail with reference to the drawings.

Figure 1:
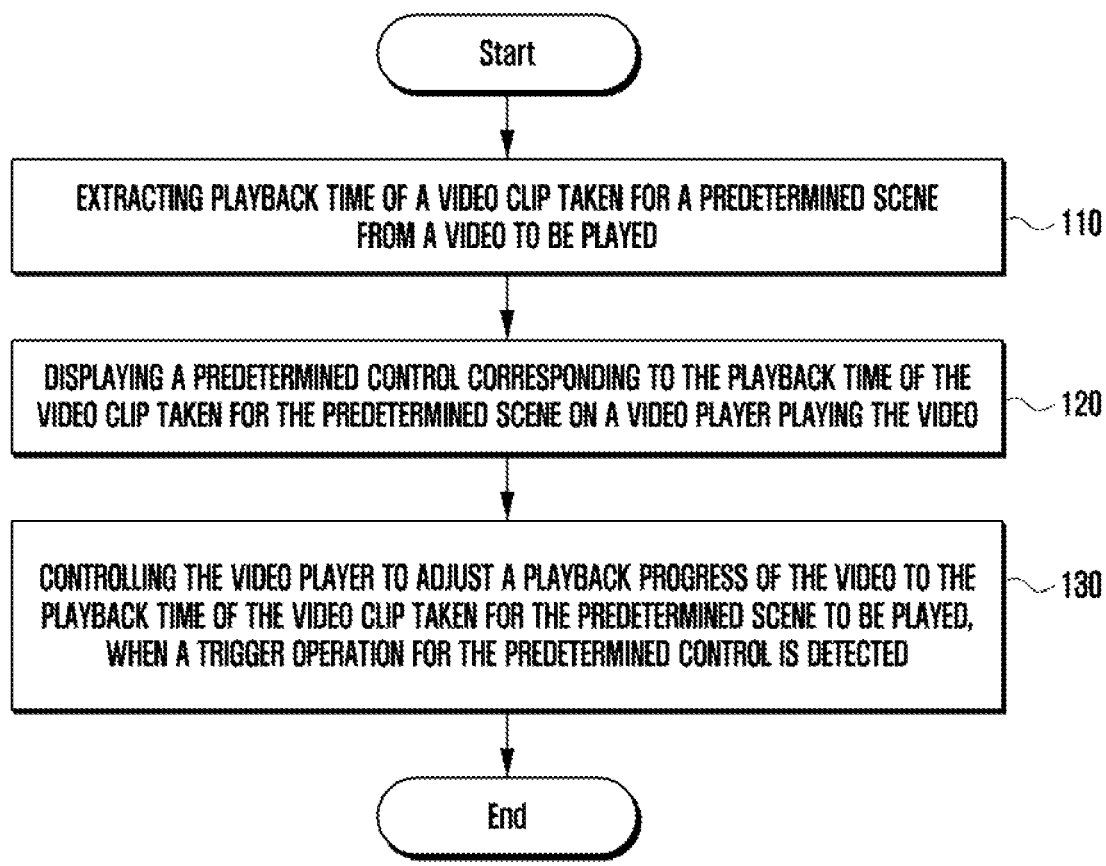
FIG. 1 is a flowchart illustrating a method for controlling video playback according to an exemplary embodiment of the present invention.

FIG. 1 is a flowchart illustrating a method for controlling video playback according to an exemplary embodiment of the present invention.

In step 110, a playback time of a video clip taken for a predetermined scene from a video to be played may be extracted.

Here, the predetermined scene may be a different regional scene such as a video clip with a city, lake, valley, or grassland and so on as a background, or may be a different life scene such as a video clip with sporting, eating, or studying and so on as a background, or may be a video clip of a scene that meets a predefined condition, such as a video clip related to a user scene preference, a current hot topic, and so on.

In one example, the playback time of the video clip taken for the predetermined scene may be included in a video to be played in advance for reading and parsing directly by a video player.

In another example, a scene recognition model which is trained in advance may be used to identify the video clip taken for the predetermined scene from the video to be played, to extract the playback time of the video clip taken for the predetermined scene from the video. In the scene recognition model, the video may be divided into multiple shots that are video clips taken continuously by a camera based on a scene similarity between adjacent frame images in the video, and the video clip taken for the predetermined scene may be identified from the divided multiple shots. As a feasible implementation manner, the similarity between a frame image and a previous frame image may be calculated for each frame image in the video, and the frame image may be merged into a shot to which the previous frame image belongs when the similarity reaches a predetermined threshold.

Meanwhile, considering that switching multiple shots for a certain scene in a short period of time may cause the video clip taken for the certain scene to be divided into different scenes, for example, in a meeting scene, the shots are often switched to different people in the short period of time, such that the above method for dividing the video only based on the scene similarity between the adjacent frame images in the video cannot divide multiple shots switched for the meeting scene into one shot. To this end, in this example, the divided multiple shots may be further merged so as to improve an accuracy of scene classification recognition. Accordingly, in the scene recognition model, it may be determined whether there are at least two consecutively adjacent shots falling within a predetermined short period of time in a plurality of shots; it may be determined whether a similarity between the at least two consecutively adjacent shots reaches a predetermined threshold if there are the at least two consecutively adjacent shots falling within the predetermined short period of time in the plurality of shots; and the at least two consecutively adjacent shots may be merged into one shot if the similarity between the at least two consecutively adjacent lenses reaches the predetermined threshold. This may avoid dividing multiple shots switched for a same scene in the short period of time into different scenes.

Meanwhile, in this example, the similarity between the at least two consecutively adjacent shots may be determined by a similarity between any two non-adjacent shots in the at least two consecutively adjacent shots. For example, when the video is divided into a shot sequence ((A, B), (C), (D), (E), (F, G)), the shot subsequence may be extracted in turn from the first shot (A, B), until a total time t of the extracted shot subsequence is close to a predetermined short period of time T. It may be determined the similarity between consecutively adjacent shots (A, B), (C) and (D) falling within the predetermined short period of time T by determining the similarity between two non-adjacent shots (A, B) and (D), if the total time t of the extracted shot subsequence ((A,B), (C), (D)) is less than the predetermined short period of time T and the total time t of the extracted shot subsequence ((A, B), (C), (D), (E)) is greater than the predetermined short time period T. The extracted shot subsequence ((A, B), (C), (D)) may be merged into one shot, if the similarity reaches the predetermined threshold, and at this time, the video may be divided into a shot sequence ((A, B, C, D), (E), (F, G)).

Meanwhile, in this example, the similarity between shots may be determined by a similarity between key frame images in the shots. Accordingly, the similarity between the at least two consecutively adjacent shots may be determined by the similarity between the key frame images in the at least two consecutively adjacent shots. In the scene recognition model, the key frame images in the at least two consecutively adjacent shots may be extracted, and it may be determined that the similarity between the at least two consecutively adjacent shots reaches the predetermined threshold, if the similarity between the key frame images in the at least two consecutively adjacent shots reaches the predetermined threshold.

Meanwhile, in this example, a number of the key frame images in each shot may depend on a degree of change in the frame images in each shot, rather than a length of the each shot. As a feasible implementation manner, the number of the key frame images extracted for the shot in which the frame images change drastically may be greater than the number of the key frame images extracted for the shot in which the frame images change gently. For example, in a very long shot, more key frame images may be extracted for the shot if the shot changes drastically, and fewer key frame images may be extracted for the shot if the shot changes gently or the frame images remains substantially unchanged. To this end, in this example, the degree of change in the frame images in each of the at least two consecutively adjacent shots may be further determined. In the scene recognition model, an average distance of the frame images in each shot may be calculated; it may be determined that the frame images in the shot change drastically if there is a frame image having a distance greater than the average distance in the shot; and it may be determined that the frame images in the shot changes gently if there is no frame image having the distance greater than the average distance in the shot.

After the video is divided into the multiple shots using the above method, one or more video clips taken for the predetermined scene may be further identified from the divided multiple shots using artificial intelligence (AI) technique, such that the pushed scene meets user needs, and thus the user can accurately drag the video or jump in the video according to his/her preference, and the user can accurately drag or jump the video according to his/her preference. Specifically, the video clip taken for the predetermined scene may be identified from the plurality of shots according to a predefined condition, and the predefined condition may be related to the user scene preference, the current hot topic, and so on analyzed using the AI technology.

In one example, user behavior data for operating the video player may be collected, and the collected user behavior data may be analyzed to determine the user scene preference, when the predefined condition is related to the user scene preference.

Here, the user behavior data may include, but is not limited to, a repeat playback operation for any scene in any video by a user, a skip playback operation for any scene in any video by a user, a favorite operation for any scene in any video by a user, a thumb-up operation for any scene in any video by a user, and a comment operation for any scene in any video by a user, and so on.

In another example, a web crawler technology may be used to perform hotspot mining to obtain the current hot topic, such as personal tax reform, Didi hitch riding services, and so on, when the predefined condition is related to the current hot topic.

In step 120, a predetermined control corresponding to the playback time of the video clip taken for the predetermined scene may be displayed on a video player playing the video.

Here, a number and content of the predetermined controls to be displayed may depend on a result extracted in step 110, but is not limited thereto.

As an example, a plurality of corresponding predetermined controls may be created and displayed to control the playback of different predetermined scenes, respectively, and only a single predetermined control may be created and displayed to switch back and forth between the playback of the different predetermined scenes, when there are multiple predetermined scenes in the extracted result.

In one example, prompt information for indicating the predetermined control may be displayed on the video player. This can guide the user to quickly locate the scene that the user is interested in. The prompt information may include, but is not limited to, playback time related to the predetermined scene, descriptive information related to the predetermined scene, a scene thumbnail related to the predetermined scene, and so on.

In step 130, the video player may be controlled to adjust a playback progress of the video to the playback time of the video clip taken for the predetermined scene to be played, when a trigger operation for the predetermined control is detected.

Here, the trigger operation for the predetermined control may include, but is not limited to, common trigger operations such as clicking, long pressing, and touching. Specifically, the trigger operation for the predetermined control may be determined depending on the implementation form of the predetermined control.

As an example, when the predetermined control is implemented as a playback point on a playback progress bar of the video player, the trigger operation for the playback point may include a trigger operation for dragging a drag block on the playback progress bar of the video player to the playback point in addition to the above common trigger operations.

Figure 2:
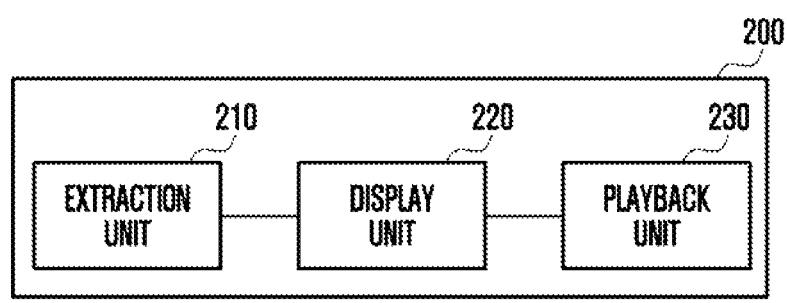
FIG. 2 is a block diagram illustrating a structure of a device for controlling video playback according to an exemplary embodiment of the present invention.

FIG. 2 is a block diagram illustrating a structure of a device for controlling video playback according to an exemplary embodiment of the present invention.

Referring to FIG. 2, the device 200 shown in FIG. 2 may include an extraction unit 210, a display unit 220, and a playback unit 230. The extraction unit 210 may extract a playback time of a video clip taken for a predetermined scene from a video to be played. The display unit 220 may display a predetermined control corresponding to the playback time of the video clip taken for the predetermined scene on a video player playing the video. The playback unit 230 may control the video player to adjust a playback progress of the video to the playback time of the video clip taken for the predetermined scene to be played, when a trigger operation for the predetermined control is detected.

Specifically, the device 200 shown in FIG. 2 may further includes a scene division unit and a scene recognition unit (none of which is shown). The scene division unit may divide the video into a plurality of shots that are video clips continuously taken by a camera, based on a scene similarity between adjacent frame images in the video. The scene recognition unit may identify the video clip taken for the predetermined scene from the plurality of shots.

Meanwhile, the device 200 shown in FIG. 2 may further includes a first determination unit, a second determination unit, and a shot mergence unit (none of which is shown). The first determination unit may determine whether there are at least two consecutively adjacent shots falling within a predetermined short period of time in the plurality of shots. The second determination unit many determine whether a similarity between the at least two consecutively adjacent shots reaches a predetermined threshold, if there are the at least two consecutively adjacent shots falling within the predetermined short period of time in the plurality of shots. The shot mergence unit may merge the at least two consecutively adjacent shots into one shot, if the similarity between the at least two consecutively adjacent shots reaches the predetermined threshold.

In the device 200 shown in FIG. 2, the similarity between the at least two consecutively adjacent shots may be determined by a similarity between any two non-adjacent shots in the at least two consecutively adjacent shots.

Further, the second determination unit may include a key frame extraction unit and a similarity determination unit (none of which is shown). The key frame extraction unit may extract key frame images in the at least two consecutively adjacent shots. The similarity determination unit may determine that the similarity between the at least two consecutively adjacent shots reaches the predetermined threshold, if the similarity between the key frame images in the at least two consecutively adjacent shots reaches the predetermined threshold. Also, a number of the key frame images extracted for each shot may be based on a degree of change in the frame images in each shot. As a feasible implementation manner, a number of the key frame images extracted for the shot in which the frame images change drastically may be greater than a number of the key frame images extracted for the shot in which frame images change gently.

Meanwhile, the device 200 shown in FIG. 2 may further include a third determination unit (not shown). The third determination unit may determine the degree of change in the frame images in each of the at least two consecutively adjacent shots.

Further, the third determination unit may include an average distance calculation unit, a first change determination unit, and a second change determination unit. The average distance calculation unit may calculate an average distance of the frame images in each shot. The first change determination unit may determine that the frame images in the shot change drastically, if there is a frame image having a distance greater than the average distance in the shot. The second change determination unit may determine that the frame images in the shot change gently, if there is no frame image having the distance greater than the average distance in the shot.

In the device 200 shown in FIG. 2, the scene recognition unit may identify the video clip taken for the predetermined scene from the plurality of shots according to a predefined condition.

In one example, when the predefined condition is related to a user scene preference, the device 200 shown in FIG. 2 may also include a collection unit and an analysis unit (none of which is shown). The collection unit may collect user behavior data for operating the video player. The analysis unit may analyze the collected user behavior data to determine the user scene preference.

For example, the user behavior data may include, but is not limited to, a repeat playback operation for any scene in any video by a user, a skip playback operation for any scene in any video by a user, a favorite operation for any scene in any video by a user, a thumb-up operation for any scene in any video by a user, and a comment operation for any scene in any video by a user, and so on.

In another example, when the predefined condition is related to a current hot topic, the device 200 shown in FIG. 2 may also include a hotspot unit (not shown). The hotspot unit may use a web crawler technology to perform hotspot mining to obtain the current hot topic.

Meanwhile, the device 200 shown in FIG. 2 may also include a prompt unit (not shown). The prompt unit may display prompt information for indicating the predetermined control on the video player. The prompt information may include, but is not limited to, playback time related to the predetermined scene, descriptive information related to the predetermined scene, a scene thumbnail related to the predetermined scene, and so on.

Figure 3:
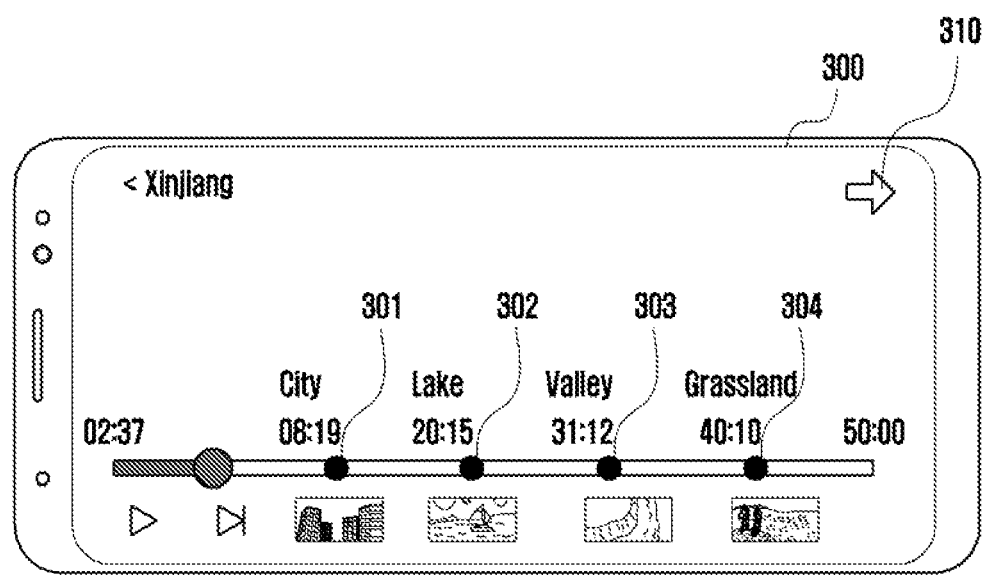
FIG. 3 is an exemplary user interface illustrating that a predetermined control corresponding to playback time of a video clip taken for a predetermined scene being displayed on a video player of a terminal apparatus according to an exemplary embodiment of the present invention.

FIG. 3 is an exemplary user interface 300 illustrating a predetermined control corresponding to playback time of a video clip taken for a predetermined scene being displayed on a video player of a terminal apparatus according to an exemplary embodiment of the present invention.

As shown in FIG. 3, the user interface 300 may be presented by the video player in the terminal apparatus. In the user interface 300, in addition to a video duration that has been played, a total video duration, and a progress bar, a playback progress bar of the video player may include playback points 301, 302, 303, and 304 corresponding to the playback time of the video clips taken for the predetermined scenes, where the playback point 301 corresponds to the playback time "08:19" of the video clip of a "City" scene in a video about "XinJiang" region currently being played by the video player, the playback point 302 corresponds to the playback time "20:15" of the video clip of a "Lake" scene in the video about "XinJiang" region currently being played by the video player, the playback point 303 corresponds to the playback time "31:12" of the video clip of a "Valley" scene in the video about "XinJiang" region currently being played by the video player, and the playback point 304 corresponds to the playback time "40:10" of the video clip of a "Grassland" scene in the video about "XinJiang" region currently being played by the video player. Each of the playback points 301, 302, 303, and 304 may be configured to control the video player to adjust the playback progress of the video to the playback time of the video clip taken for the predetermined scene corresponding to the playback point to be played based on a trigger operation for the playback point by a user. Accordingly, the playback progress of the video may be adjusted to the playback time "08:19" of the video clip of the "City" scene corresponding to the playback point 301 to be played, when the user drags a drag block on the playback progress bar of the video player to the playback point 301. The playback progress of the video may be adjusted to the playback time "20:15" of the video clip of the "Lake" scene corresponding to the playback point 302 to be played, when the user drags the drag block on the playback progress bar of the video player to the playback point 302. The playback progress of the video may be adjusted to the playback time "31:12" of the video clip of the "Valley" scene corresponding to the playback point 303 to be played, when the user drags the drag block on the playback progress bar of the video player to the playback point 303. The playback progress of the video may be adjusted to the playback time "40:10" of the video clip of the "Grassland" scene corresponding to the playback point 304 to be played, when the user drags the drag block on the playback progress bar of the video player to the playback point 304. Also, a control 310 configured to fast forward to a next scene may be included in the user interface 300. Accordingly, the playback progress of the video may be adjusted to the playback time "31:12" of the video clip of the adjacent "Valley" scene to be played, when the control 310 is clicked or touched and the video is being played to the "Lake" scene.

Figure 4:
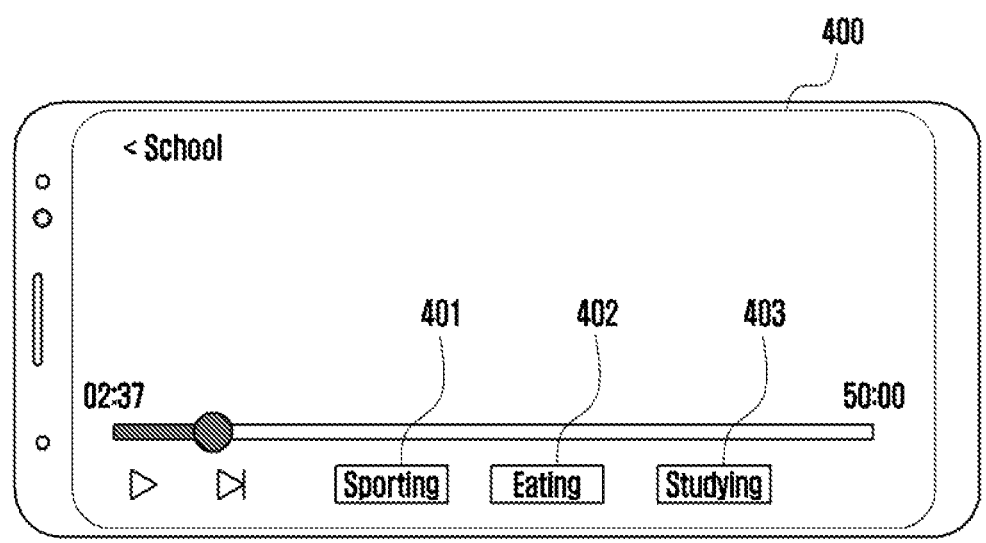
FIG. 4 is another exemplary user interface illustrating predetermined controls corresponding to playback time of a video clip taken for a predetermined scene being displayed on a video player of a terminal apparatus based on a user scene preference according to an exemplary embodiment of the present invention.

FIG. 4 is another exemplary user interface 400 illustrating predetermined controls corresponding to playback time of a video clip taken for a predetermined scene being displayed on a video player of a terminal apparatus based on a user scene preference according to an exemplary embodiment of the present invention.

As shown in FIG. 4, the user interface 400 may be presented by the video player in the terminal apparatus. In the user interface 400, in addition to a video duration that has been played, a total video duration, and a progress bar, a playback progress bar of the video player may include buttons 401, 402, and 403 corresponding to the playback time of the video clips taken for the predetermined scenes, where the button 401 corresponds to the playback time (not shown) of the video clip of a "Sporting" scene in a video about "School" life currently being played by the video player, the button 402 corresponds to the playback time (not shown) of the video clip of an "Eating" scene in the video about "School" life currently being played by the video player, and the button 403 corresponds to the playback time (not shown) of the video clip of a "Studying" scene in the video about "School" life currently being played by the video player. Each of the buttons (controls) 401, 402, and 403 may be configured to control the video player to adjust the playback progress of the video to the playback time of the video clip taken for the predetermined scene corresponding to the button to be played based on a click or touch operation on the button by a user. Accordingly, the playback progress of the video may be adjusted to the playback time of the video clip of the "Sporting" scene corresponding to the button 401 to be played, when the button 401 is clicked or touched. The playback progress of the video may be adjusted to the playback time of the video clip of the "Eating" scene corresponding to the button 402 to be played, when the button 402 is clicked or touched. The playback progress of the video may be adjusted to the playback time of the video clip of the "Studying" scene corresponding to the button 403 to be played, when the button 403 is clicked or touched.

Figure 5:
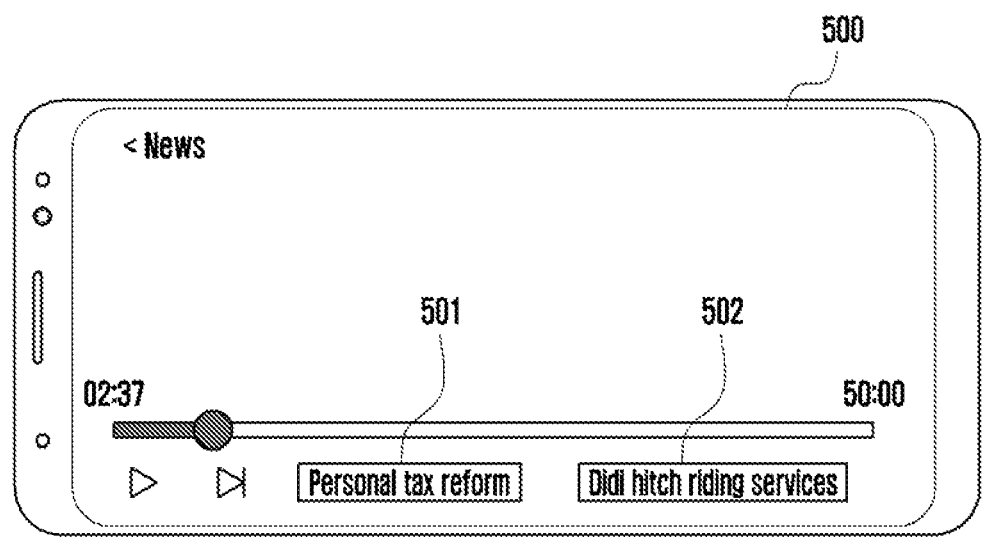
FIG. 5 is yet another exemplary user interface illustrating predetermined controls corresponding to playback time of a video clip taken for a predetermined scene being displayed on a video player of a terminal apparatus based on current hot topics according to an exemplary embodiment of the present invention.

FIG. 5 is yet another exemplary user interface 500 illustrating predetermined control corresponding to playback time of a video clip taken for a predetermined scene being displayed on a video player of a terminal apparatus based on current hot topics according to an exemplary embodiment of the present invention.

As shown in FIG. 5, the user interface 500 may be presented by the video player in the terminal apparatus. In the user interface 500, in addition to a video duration that has been played, a total video duration, and a progress bar, a playback progress bar of the video player may include buttons 501 and 502 corresponding to the playback time of the video clips taken for the predetermined scenes, where the button 501 corresponds to the playback time (not shown) of a video clip of a "Personal tax reform" scene in a video about "News" currently being played by the video player, and the button 502 corresponds to the playback time (not shown) of a video clip of a "Didi hitch riding services" scene in the video about "News" currently being played by the video player. Each of the buttons 501 and 502 may be configured to control the video player to adjust the playback progress of the video to the playback time of the video clip of the scene corresponding to the button based on a click or touch operation for the button by a user. Accordingly, the playback progress of the video may be adjusted to the playback time of the video clip of the "Personal tax reform" scene corresponding to the button 501 to be played, when the button 501 is clicked or touched. The playback progress of the video may be adjusted to the playback time of the video clip of the "Didi hitch riding services" scene corresponding to the button 502 to be played, when the button 502 is clicked or touched.

Figure 6:
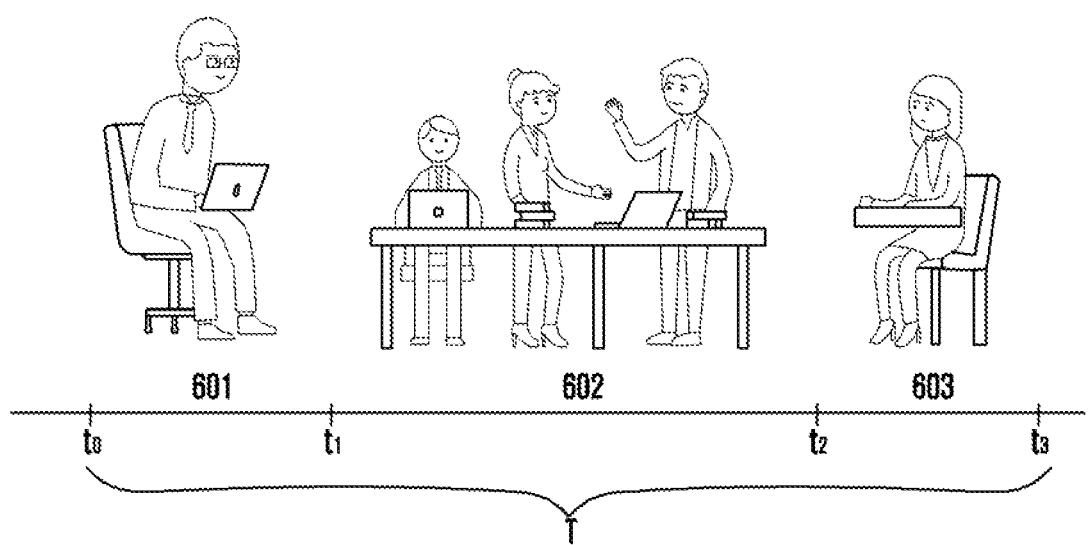
FIG. 6 is a schematic diagram illustrating a plurality of consecutively adjacent shots falling within a predetermined short period of time and having a similarity of key frame images reaching a predetermined threshold being merged into one shot according to exemplary embodiment of the present invention.

FIG. 6 is a schematic diagram illustrating a plurality of consecutively adjacent shots falling within a predetermined short period of time and having a similarity of key frame images reaching a predetermined threshold being merged into one shot according to exemplary embodiment of the present invention.

As shown in FIG. 6, the shot 601 is a video clip from $t_0$ to $t_1$ in a video taken for a meeting scene, the shot 602 is a video clip from $t_1$ to $t_2$ in the video taken for the meeting scene, and the shot 603 is a video clip from $t_2$ to $t_3$ in the video taken for the meeting scene. The three consecutively adjacent shots 601, 602, and 603 cannot be divided into one shot only based on a similarity between adjacent frame images, since the three consecutively adjacent shots 601, 602, and 603 are frequently switched to different people in a short period of time. In view of this case, the above method may be used to merge the three consecutively adjacent shots 601, 602 and 603 into one shot by determining whether the three consecutively adjacent shots 601, 602 and 603 fall within the predetermined short period of time T and determining whether the similarity between the key frame images of the three consecutively adjacent shots 601, 602 and 603 reaches the predetermined threshold, to avoid dividing multiple shots switched for a certain scene (such as, but not limited to, a meeting) in a short period of time into different scenes, thereby further improving an accuracy of scene classification recognition.

It can be seen that, the above implementation process of the present invention can not only assist a user to accurately jump to or directly locate a video scene clip that the user is interested in, but also can push the video scene clip that the user is interested in to the user according to predefined conditions such as user preferences and current hot topics, thereby saving user viewing time for the video and filtering out a video scene clip that the user is not interested in to make viewing experience easier and more enjoyable.

An exemplary embodiment according to the present invention also provides a computer-readable storage medium storing a computer program. The computer-readable storage medium stores a computer program that, when executed by a processor, causes the processor to execute the method for controlling video playback according to the present invention. The computer-readable recording medium is any data storage device that may store data read out by a computer system. Examples of the computer-readable recording medium include a read-only memory, a random access memory, a read-only optical disk, a magnetic tape, a floppy disk, an optical data storage device, and a carrier wave, such as data transmission through Internet via a wired or wireless transmission path.

A computer device is also provided according to an exemplary embodiment of the present invention. The computer device includes a processor and a memory. The memory is used to store a computer program. The computer program is executed by the processor such that the processor executes the computer program of the method for controlling video playback according to the present invention.

Although the present application has been shown and described with reference to the preferred embodiments, those skilled in the art should understand that various modifications and changes may be made to these embodiments without departing from the spirit and scope of the application defined by the claims.

The invention claimed is:

1. A method for controlling video playback, comprising:
   extracting playback time of a video clip taken for a predetermined scene from a video to be played;
   displaying a predetermined control corresponding to the playback time of the video clip taken for the predetermined scene on a video player playing the video;
   controlling the video player to adjust a playback progress of the video to the playback time of the video clip taken for the predetermined scene to be played, when a trigger operation for the predetermined control is detected;
   dividing the video into a plurality of shots;
   extracting a number of key frame images in at least two consecutively adjacent shots of the plurality of shots; and
   determining whether a similarity between the at least two consecutively adjacent shots reaches a predetermined threshold based on a similarity between the number of key frame images reaching the predetermined threshold,
   wherein the number of key frame images to extract is determined based on a degree of change in frame images in each shot of the at least two consecutively adjacent shots.

2. The method according to claim 1, wherein the predetermined control is a predetermined playback point on a playback progress bar of the video player, and
   wherein the trigger operation for the predetermined control comprises a trigger operation for dragging a drag block on the playback progress bar of the video player to the predetermined playback point.

3. The method according to claim 1, further comprising:
   displaying prompt information for indicating the predetermined control on the video player,
   wherein the prompt information comprises at least one of:
   playback time related to the predetermined scene,
   descriptive information related to the predetermined scene, and
   a scene thumbnail related to the predetermined scene.

4. The method according to claim 1, further comprising:
   merging the at least two consecutively adjacent shots into one shot, if the similarity between the at least two consecutively adjacent shots reaches the predetermined threshold.

5. The method according to claim 4,
   wherein the number of key frame images extracted for a shot in which frame images change drastically is greater than the number of key frame images extracted for a shot in which frame images change gently.

6. The method according to claim 5,
   wherein the degree of change is determined by:
   calculating an average distance of the frame images in each shot;
   determining that the frame images in the shot change drastically, if there is a frame image having a distance greater than the average distance in the shot; and
   determining that the frame images in the shot changes gently, if there is no frame image having the distance greater than the average distance in the shot.

7. The method according to claim 4, further comprising:
   identifying the video clip taken for the predetermined scene from the plurality of shots according to a predefined condition, the predefined condition being related to a user scene preference;
   collecting user behavior data for operating the video player; and
   analyzing the collected user behavior data to determine the user scene preference,
   wherein the user behavior data includes at least one of:
   a repeat playback operation for any scene in any video by a user,
   a skip playback operation for any scene in any video by a user,
   a favorite operation for any scene in any video by a user,
   a thumb-up operation for any scene in any video by a user, and
   a comment operation for any scene in any video by a user.

8. The method according to claim 7, wherein the predefined condition is related to a current hot topic, and
   wherein the method further comprises:
   using a web crawler technology to perform hotspot mining to obtain the current hot topic.

9. A device for controlling video playback, comprising at least one processor configured to implement:
   an extraction unit configured to extract playback time of a video clip taken for a predetermined scene from a video to be played;
   a display unit configured to display a predetermined control corresponding to the playback time of the video clip taken for the predetermined scene on a video player playing the video;
   a playback unit configured to control the video player to adjust a playback progress of the video to the playback time of the video clip taken for the predetermined scene to be played, when a trigger operation for the predetermined control is detected,
   a scene division unit configured to divide the video into a plurality of shots,
   a key frame extraction unit configured to extract a number of key frame images in at least two consecutively adjacent shots of the plurality of shots, and
   a similarity determination unit configured to determine whether a similarity between the at least two consecutively adjacent shots reaches a predetermined threshold based on a similarity between the number of key frame images reaching the predetermined threshold,
   wherein the number of key frame images to extract is determined based on a degree of change in frame images in each shot of the at least two consecutively adjacent shots.

10. The device according to claim 9, wherein the predetermined control is a predetermined playback point on a playback progress bar of the video player, and
    wherein the trigger operation for the predetermined control comprises a trigger operation for dragging a drag block on the playback progress bar of the video player to the predetermined playback point.

11. The device according to claim 9, wherein the at least one processor is further configured to implement:
    a prompt unit configured to display prompt information for indicating the predetermined control on the video player,
    wherein the prompt information comprises at least one of:
    playback time related to the predetermined scene,
    descriptive information related to the predetermined scene, and
    a scene thumbnail related to the predetermined scene.

12. The device according to claim 9, wherein the at least one processor is further configured to implement:
    a shot mergence unit configured to merge the at least two consecutively adjacent shots into one shot, if the similarity between the at least two consecutively adjacent shots reaches the predetermined threshold.

13. The device according to claim 12,
wherein the number of key frame images extracted for shot in which frame images change drastically is greater than the number of key frame images extracted for shot in which the frame images change gently.

14. The device according to claim 13, wherein the at least one processor is further configured to implement:
a third determination unit configured to determine the degree of change in the frame images in each of the at least two consecutively adjacent shots, and
wherein the third determination unit comprises:
an average distance calculation unit configured to calculate an average distance of the frame images in each shot;
a first change determination unit to determine that the frame images in the shot changes drastically, if there is a frame image having a distance greater than the average distance in the shot; and
a second change determination unit configured to determine that the frame images in the shot changes gently, if there is no frame image having the distance greater than the average distance in the shot.

15. The device according to claim 12, wherein the at least one processor is further configured to implement:
a scene recognition unit configured to identify the video clip taken for the predetermined scene from the plurality of shots according to a predefined condition, the predefined condition being related to a user scene preference,
a collection unit configured to collect user behavior data for operating the video player; and
an analysis unit configured to analyze the collected user behavior data to determine the user scene preference, wherein the user behavior data includes at least one of:
a repeat playback operation for any scene in any video by a user,
a skip playback operation for any scene in any video by a user,
a favorite operation for any scene in any video by a user,
a thumb-up operation for any scene in any video by a user, and
a comment operation for any scene in any video by a user.

* * * * *